(12) United States Patent
Willgert

(10) Patent No.: US 8,466,773 B2
(45) Date of Patent: Jun. 18, 2013

(54) METHOD OF AUTHORIZATION

(76) Inventor: Mikael Willgert, Spånga (SE)

( * ) Notice: Subject to any disclaimer, the term of this patent is extended or adjusted under 35 U.S.C. 154(b) by 1299 days.

(21) Appl. No.: 10/590,336

(22) PCT Filed: Feb. 21, 2005

(86) PCT No.: PCT/SE2005/000233
§ 371 (c)(1),
(2), (4) Date: May 7, 2007

(87) PCT Pub. No.: WO2005/080720
PCT Pub. Date: Sep. 1, 2005

(65) Prior Publication Data
US 2008/0211620 A1    Sep. 4, 2008

(30) Foreign Application Priority Data
Feb. 24, 2004   (SE) ...................................... 0400425

(51) Int. Cl.
| G05B 19/00 | (2006.01) |
| G06F 7/00 | (2006.01) |
| G08B 29/00 | (2006.01) |
| H04B 1/00 | (2006.01) |
| H04Q 1/00 | (2006.01) |

(52) U.S. Cl.
USPC ........... 340/5.2; 340/5.5; 340/5.26; 340/5.73; 340/425.1

(58) Field of Classification Search
USPC ................ 340/5.2, 5.5, 5.26, 5.64, 5.73, 426, 340/425.5; 455/569.2, 41.2, 41.3, 420, 418, 455/410; 307/10.2
See application file for complete search history.

(56) References Cited

U.S. PATENT DOCUMENTS

| 5,134,392 | A | | 7/1992 | Takeuchi et al. ............. 340/5.62 |
| 5,668,876 | A | * | 9/1997 | Falk et al. ..................... 380/271 |
| 5,736,932 | A | * | 4/1998 | Bulfer et al. ................. 340/5.74 |
| 6,720,861 | B1 | * | 4/2004 | Rodenbeck et al. ......... 340/5.64 |
| 6,762,684 | B1 | * | 7/2004 | Camhi ......................... 340/573.1 |
| 6,819,917 | B2 | * | 11/2004 | Yamauchi ..................... 455/411 |
| 7,012,503 | B2 | * | 3/2006 | Nielsen ......................... 340/5.6 |
| 7,113,300 | B2 | * | 9/2006 | Strobel et al. ................ 358/1.15 |
| 7,313,383 | B2 | * | 12/2007 | Fujii ............................. 455/410 |
| 7,321,288 | B2 | * | 1/2008 | Nishimura .................... 340/5.2 |
| 7,606,558 | B2 | * | 10/2009 | Despain et al. .............. 455/410 |
| 8,165,299 | B2 | * | 4/2012 | Andersson .................... 380/270 |

FOREIGN PATENT DOCUMENTS
WO   WO 01/23694 A1   4/2001
WO   WO 02/084896 A1  10/2002

* cited by examiner

*Primary Examiner* — Nam V Nguyen
(74) *Attorney, Agent, or Firm* — Alfred J. Mangels

(57) ABSTRACT

A method for granting access to restricted areas such as computers, doors, vehicles, or other areas to which access by a user is controlled. An access code is transmitted from a central computer via radio waves to a user's radio terminal, such as a mobile telephone. The radio terminal transmits the access code over a short-range radio link to a communication device at the restricted area. The communication device transmits the access code to the central computer, which compares the received code with the code that the computer transmitted to the radio terminal to determine whether access should be granted.

12 Claims, 1 Drawing Sheet

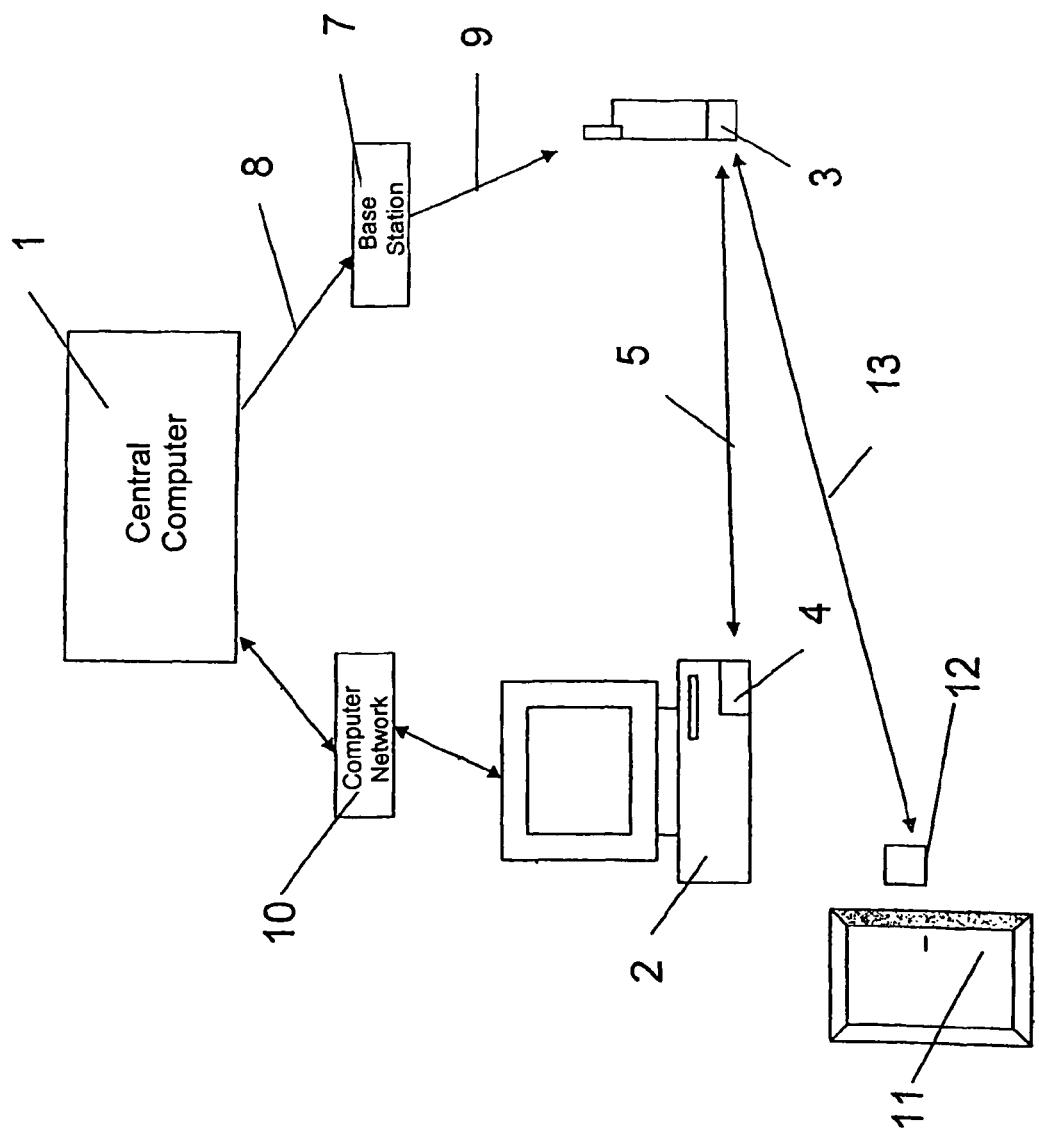

METHOD OF AUTHORIZATION

BACKGROUND OF THE INVENTION

1. Field of the Invention

The present invention concerns a method for granting access to restricted areas such as computers, doors, vehicles, or other areas to which access by a user is controlled.

2. Description of the Related Art

Computers and mobile telephones are currently used as equipment for carrying out transactions and for giving a signature of different types. Furthermore, computers are used to an ever greater degree to collect information with different degrees of confidentiality. It is often sufficient to log in with a password or a PIN code in order to subsequently be able to carry out transactions or to handle information during a limited period. That means that a terminal might be open for use by an unauthorized person if it is left unmonitored, or if it is stolen within a certain time from the time an authorized user logged in.

In order to prevent that, there are requirements for codes, or for the use of a magnetic card, or what is known as a "smart card" as a means of identification. One disadvantage of such systems is that the user often considers them as burdensome, and as a result often seeks to exploit shortcuts, which reduces the level of security.

One problem with codes is that they can be read by an eavesdropper unless the information has been encrypted, which can create a demand for particular software, hardware, or a password that is to be distributed such that it can be used by the user.

The present invention solves that problem and offers a method by which the identity of a user can be established with high security.

SUMMARY OF THE INVENTION

The present invention thus relates to a method for granting access to restricted areas such as computers, doors, vehicles, or other areas to which access by a user is desired to be controlled. The method includes the transmission of a code over a short-range radio link. An access code (an ID-code) is transmitted from a central computer using radio waves, to a radio terminal in the possession of the user. The radio terminal transmits the ID-code over the short-range radio link to the restricted area. A transmitter unit in the restricted area transmits the ID-code to the central computer, and the central computer compares the received code with the code that the central computer transmitted to the radio terminal.

BRIEF DESCRIPTION OF THE DRAWING

The invention will be described in more detail below in association with embodiments of the invention as shown in the attached drawing, wherein FIG. 1 shows a block diagram of embodiments of an access control system.

DESCRIPTION OF THE PREFERRED EMBODIMENTS

The present invention thus concerns a method for granting access to restricted areas such as computers, doors, vehicles, or other areas to which it is desired that a user have access. The invention will be described below in association with an embodiment in which access to a computer is desired, and also an embodiment in which access to a locked door is desired. However, the invention can be utilized for other restricted areas to which it is desired to grant access, such as vehicles, telephones, etc.

The method includes the transmission to the restricted area of an ID-code over a short-range radio link.

According to the invention, an access code (an ID-code) is transmitted from a central computer 1 over radio waves to a radio terminal 3 in the possession of the user. The radio terminal can be, for example, and preferably is, a mobile telephone. It can, however, for certain applications be constituted by a communication radio of the type, for example, that is used by rescue services. For the example in which the radio terminal is a mobile telephone, the transmission takes place over a telephone network 8, via a base station 7, to the telephone 3 via radio link 9.

Furthermore, the radio terminal 3 transmits the ID-code over a short-range radio link 5 to the restricted area 2, as is illustrated by means of the arrow.

The restricted areas in the form of a computer 2, and a door 11, or a transmitter unit 4, 12 within the restricted area transmits the ID-code to the central computer 1 over a computer network 10.

The central computer 1 subsequently compares the code that has been received with the code that the central computer transmitted to the radio terminal 3.

A circuit has in that way been created in which a transmitted code can be compared with a received code. In the case that the codes agree with each other, the central computer 1 can, in the next stage, transmit a second code to the computer 2 that makes it possible for the computer to be used in the manner intended by the user.

Since the central computer 1 transmits an ID-code to a particular mobile telephone or other radio terminal 3, it can be assumed that the user of that mobile telephone is the person who transmits the ID-code to the computer 2 over the short-range radio link 5. Alternatively, the circuit can be used in such a manner that a comparison of whether the codes agree is made, which in that way can be assumed to specify that the correct person is using the computer, or that the use of the computer is unauthorized.

According to one preferred embodiment, the central computer 1 is initiated to transmit an ID-code to the radio terminal 3 as a result of either a transmitting device associated with the restricted area, or the radio terminal transmitting a request for a code to the central computer 1. With respect to the computer 2, the request can be transmitted over the computer network 6, 10, 15, or, with respect to a mobile telephone, over the mobile telephone network 7, 8, 9.

It is naturally possible to initiate the circuit at any freely chosen point, i.e., at the central computer 1, at the mobile telephone 3, or at the computer 2.

According to one preferred design, the short-range radio link 5 is what is known as an "RFID" link of known type. Such links work in two directions with two transmitting units and two receiving units, or they can work in one direction only such that one unit transmits an inquiry signal that is received by, modulated by, and reflected by a second part in the form of a transponder. The ID-code can, for example, be transmitted in that manner by means of the modulation.

According to an alternative preferred embodiment, the short-range radio link 5 is what is known as a "Bluetooth" link.

The computer 2, or the door 11, and the radio terminal 3 have in both cases a transmitter/receiver unit 3, 4, and 3, 12, respectively for the short range radio link.

According to one preferred embodiment, the radio terminal 3 is a mobile telephone constituting one part of the short-range radio link. The radio terminal 3 is preferably a mobile telephone with an integral Bluetooth function.

A Bluetooth module is thus built into the computer 2, and the door 11. It is also possible to use another radio technology, such as WLAN (Wireless Local Area Network). However, it is important that the range of the radio link be made sufficiently short, independently of the technology used, in order to activate access to only the restricted areas that are intended.

According to one embodiment, the restricted area is a computer 2 or a computer terminal to which access is required.

In that embodiment, the user can request via the computer 2 a code from the central computer 1 in order to be able to use the computer 2. That request can contain the ID-code of the user. The central computer 1 thus transmits the code to the mobile telephone 3 of the user, which subsequently transmits the code over the short range radio link 5 to the computer 2. The computer 2 transmits the code to the central computer 1. The central computer in that way receives confirmation that the correct code has been received by the computer 2, whereby the user can use the computer 2 in the manner that is granted by the code. That can be a question of full or limited use, such as carrying out financial transactions.

According to a second embodiment, the restricted area to which access is to be authorized is a door 11 or a gateway to which access is required so that it can be opened. In that case it is preferred that the restricted area includes a communicator 12 connected by a communications link to the central computer 1, which communicator 12 is arranged to communicate with the radio terminal 3 over a short distance using an RFID link or a Bluetooth link as short range radio link 13.

According to that second embodiment, it can be a question of rescue personnel being equipped with a radio terminal 3 in the form of a mobile telephone with an integral RFID link or a Bluetooth link as short range radio link 13. The communicator 12 is also equipped with such a link. When a fire-fighter, for example, wishes to open the door, he calls the central computer 1 over the telephone network 7, 8, 9 and transmits identifying information about the door that is concerned. The identifying information can be a numerical designation or another unique identifier.

Alternatively, the telephone 3 communicates through the short range link 13 with the communicator 12, whereby the number of the mobile telephone is transmitted to the communicator 12. In the latter case, the mobile telephone and door identifying information is transmitted from the communicator 12 to the central computer 1. In both cases, the central computer 1 subsequently transmits a code to the mobile telephone 3 that, once it has received the code, transmits it to the communicator 12 over the short range link 13, whereupon the door can be opened.

It is clear, both in the case of a computer 2 and in the case of a door 11, that the code can vary with time when the central computer 1 transmits the code to the radio terminal 3 and to the respective restricted areas 2; 11. Variation in time makes unauthorized acquisition of the code through eavesdropping significantly more difficult.

According to one preferred embodiment the communicators associated with the restrictive areas 2; 11 can be configured to compare the codes received from the computer 1 and from the radio terminal 3.

According to one preferred embodiment, the code transmitted to the central computer 1 includes a network address belonging to the respective restricted area 2; 11. That means that the restricted area is identified for the central computer 1, and that not only facilitates the transmission of a code from the central computer 1 to the respective restricted area, it also increases the security in the system against unauthorized use.

According to one embodiment, the system can be used to ensure that, for example, the right people enter a meeting room. In that case, a person's transponder, in the form of an RFID circuit or a Bluetooth circuit in the mobile telephone of the person, is read by a communicator 12 at the door of the room. The communicator 12 transmits to the central computer 1 a code that is associated with the person's transponder. The central computer 1 transmits a temporary code to the mobile telephone 3 of the person, which mobile telephone sends the code onwards to the central computer 1 through the communicator 12. A circuit has in that way been created, in which the central computer has information about the temporary code, the person's mobile telephone number coupled to that code that was initially read, and the name of the person.

According to another preferred embodiment, the code is used to encrypt information that is transmitted from the restricted area to the central computer. The code can in that way include an encryption key. That further increases the security against the unauthorized use of a code that has been read by eavesdropping.

According to a further preferred embodiment, the respective restricted area 2; 11 includes a reading arrangement in communicators 4; 12 in order to read biometric data of the user, and in order to cause the communicator in the respective restricted area 2; 11 to transmit biometric data to the central computer 1. Such biometric data is transmitted to the central computer 1 for comparison with reference data previously stored in the central computer, in order to further increase the security that it is the correct person that is using the radio terminal 3 or the computer 2. The reading arrangement 4; 12 for reading biometric data of the user can be a reading arrangement known per se of a suitable type, such as for reading fingerprints or the iris of the eye.

A number of embodiments have been described above. It is, however, clear that the invention can be varied, for example with respect to the location at which the circuit is initiated and started, and the number of different restrictive areas to be accessed and that that form the circuit can also be varied.

The present invention, therefore, is not to be seen as limited to the embodiments specified above, since the invention can be varied within the scope of the attached claims.

What is claimed is:

1. A method for granting access to a restricted area, said method comprising the steps of:
   transmitting by a user of a portable radio terminal a request to a central computer for an access code to enable access by the user to a restricted area wherein the central computer contains access codes and contains information corresponding with the identity of at least one of authorized users of the restricted area and of portable radio terminals authorized to obtain access to the restricted area;
   verifying in the central computer that information corresponding with at least one of the identity of the user of the portable radio terminal and the identity of the portable radio terminal included with the request received by it from the portable radio terminal corresponds with stored identification information in the central computer relative to allowed access to the restricted area by authorized users and by authorized portable radio terminals;
   after verification in the central computer of allowed access by at least one of the user and the portable radio terminal, transmitting from the central computer via radio waves a stored access code to the portable radio terminal possessed by the user;

transmitting from the portable radio terminal over a short-range radio link to a transmitter unit associated with the restricted area to which access is sought by the user the access code received by the portable radio terminal from the central computer;

transmitting to the central computer from the transmitter unit associated with the restricted area the access code received by the transmitter unit from the portable radio terminal; and comparing in the central computer the access code received from the transmitter unit associated with the restricted area with the stored access code that the central computer transmitted to the portable radio terminal, to allow access to the restricted area by the user of the portable radio terminal when the access code received from the transmitter unit associated with the restricted area corresponds with the stored access code that was transmitted by the central computer to the portable radio terminal, thereby creating a closed circuit for comparing an access code transmitted by the central computer with an access code received by the central computer, wherein the closed circuit is created by sequentially transmitting the access code from the central computer to provide the access code to the portable radio terminal as a received access code, by transmitting the received access code from the portable radio terminal to provide the received access code to the restricted area, and by transmitting the received access code from the restricted area to the central computer for comparison with the transmitted access code.

2. A method according to claim 1, including the step of transmitting from the central computer an access code to the radio terminal when an inquiry for an access code is transmitted to the central computer by at least one of a communication device associated with the restricted area and the radio terminal.

3. A method according to claim 1, wherein the radio terminal is a mobile telephone constituting one component of said short-range radio link.

4. A method according to claim 1, wherein the short-range radio link is an RFID link.

5. A method according to claim 1, wherein the short-range radio link is a Bluetooth link.

6. A method according to claim 1, wherein the restricted area is a computer terminal to which access is desired.

7. A method according to claim 1, wherein the restricted area is a closed entryway to which access is desired so that it can be opened.

8. A method according to claim 1, wherein the restricted area includes a device for comparing the access code received from the central computer and the access code received from the radio terminal.

9. A method according to claim 1, including the steps of: providing at the restricted area a communicator connected to the central computer by a communications link; and communicating from the communicator at short range with the radio terminal by at least one of an RFID link and a Bluetooth link.

10. A method according to claim 9, wherein the access code transmitted from the restricted area to the central computer includes a network address associated with the restricted area.

11. A method according to claim 1, including the step of utilizing the access code to encrypt information that is transmitted from the restricted area to the central computer.

12. A method according to claim 1, including the steps of: providing a reading device for reading biometric data associated with the user, and transmitting user-associated biometric data from the restricted area to the central computer.

* * * * *